US009983988B1

(12) United States Patent
Quadros et al.

(10) Patent No.: US 9,983,988 B1
(45) Date of Patent: May 29, 2018

(54) RESUMING TESTING AFTER A DESTRUCTIVE EVENT

(71) Applicant: Amazon Technologies, Inc., Seattle, WA (US)

(72) Inventors: Kevin Lester Quadros, Redmond, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 15/191,395

(22) Filed: Jun. 23, 2016

(51) Int. Cl.
*G06F 11/00* (2006.01)
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3664; G06F 11/3006; G06F 11/3055; G06F 11/2635; G06F 2009/45591; G06F 2009/45595; G06F 9/5044; G06F 9/5055; H04L 41/046; H04L 41/5035; A61B 8/58; G01R 31/319
See application file for complete search history.

(56) References Cited

U.S. PATENT DOCUMENTS

| | | | | |
|---|---|---|---|---|
| 5,619,621 A * | 4/1997 | Puckett | ............... | G06F 11/2257 706/45 |
| 6,163,317 A * | 12/2000 | de Judicibus | ......... | G06F 3/0481 715/853 |
| 6,678,828 B1 * | 1/2004 | Pham | .................... | G06F 3/0622 726/2 |
| 6,760,862 B1 * | 7/2004 | Schreiber | ............ | G06F 11/1438 714/15 |
| 7,143,007 B2 * | 11/2006 | Long | .................. | G05B 19/4065 702/184 |
| 7,225,137 B1 * | 5/2007 | Barritz | .................... | G06Q 10/06 705/348 |
| 7,366,113 B1 * | 4/2008 | Chandra | ................. | H04L 41/12 370/255 |
| 2003/0229467 A1 * | 12/2003 | Lara | ..................... | G01R 31/319 702/119 |
| 2004/0103413 A1 * | 5/2004 | Mandava | .............. | G06F 9/5044 718/100 |

(Continued)

*Primary Examiner* — Bryce P Bonzo
*Assistant Examiner* — Jeison C Arcos
(74) *Attorney, Agent, or Firm* — Thorpe North & Western, LLP.

(57) ABSTRACT

Technology is described for resuming testing operations after a destructive event occurs. A runner agent and tests may be executed on an operating system. A test state may be stored in a persistent storage location. Another operation may be setting a scheduled task to run on occurrence of a start event for a portion of the operating system. The scheduled task may be configured re-execute or re-launch the runner agent upon occurrence of the start event. In addition, the start event may be received for the portion of the operating system for which a destructive event occurred, and the runner agent that was affected by the destructive event may be re-started as directed by the scheduled task. The test state may be identified from the persistent storage location. Further, a portion of test code may be selected to execute based on the test state.

20 Claims, 7 Drawing Sheets

(56) References Cited

U.S. PATENT DOCUMENTS

| | | | |
|---|---|---|---|
| 2004/0128651 A1* | 7/2004 | Lau | G06F 11/3664 717/124 |
| 2004/0236820 A1* | 11/2004 | Flocken | G06F 11/0709 709/200 |
| 2005/0114500 A1* | 5/2005 | Monk | H04L 41/22 709/224 |
| 2006/0036670 A1* | 2/2006 | Musman | H04L 41/044 709/202 |
| 2006/0200494 A1* | 9/2006 | Sparks | H04L 41/12 |
| 2006/0218301 A1* | 9/2006 | O'Toole | H04L 12/185 709/244 |
| 2008/0082657 A1* | 4/2008 | Hart | H04L 41/0681 709/224 |
| 2011/0126059 A1* | 5/2011 | Klein | G06F 11/3006 714/47.1 |
| 2011/0296382 A1* | 12/2011 | Pasternak | G06F 11/3688 717/124 |
| 2011/0296383 A1* | 12/2011 | Pasternak | G06F 11/3688 717/124 |
| 2011/0296384 A1* | 12/2011 | Pasternak | G06F 11/3688 717/124 |
| 2012/0266020 A1* | 10/2012 | Souvannarath | G06F 11/0709 714/26 |
| 2013/0179565 A1* | 7/2013 | Hart | H04L 41/0681 709/224 |
| 2013/0219363 A1* | 8/2013 | Wu | G06F 11/3664 717/124 |
| 2014/0289574 A1* | 9/2014 | Tsern | G11C 29/50016 714/718 |
| 2017/0351599 A1* | 12/2017 | Elimeleh | G06F 11/3688 |

\* cited by examiner

RESUMING TESTING AFTER A DESTRUCTIVE EVENT

BACKGROUND

Computer program and environment testing is a process in which programs that are executable in a computing environment may be tested for desired functionality and/or stability. For example, a program and computing environment may be tested to ensure that the program and environment performs functions correctly on command, is free of bugs (e.g., errors or other defects), etc. Testing of programs and computing environments may be performed by developers during the development of a program prior to the program release in a defined computing environment.

Program testing may be performed using manual testing models, automated testing models, or both. In automated testing, the program and computing environment may be tested using a test suite that includes a set of test scripts or test instructions for testing the program and testing the robustness of the computing environment. The test suite may be executed against the program, application, and/or computing environment to determine whether the program and computing environment functions as expected.

Distributed applications may also execute within a virtualized service provider environment and may also need to be tested. A virtualized service provider environment may be made available to a customer (e.g., a person or a business) through a service provider that provides virtualization technologies for computing resources. Accordingly, the customer may, for example, launch virtual computing resources (e.g., computing instances, data store instances, distributed applications, individual applications, or other virtualized objects) within the customer's environment. These virtual computing resources may interact with one another within the virtualized service provider environment in various ways depending on how the service provider environment is designed. In addition, a distributed application in a virtualized computing service environment may be tested to determine how the distributed application performs under a load in the computing service environment. The customer may also desire to perform tests to verify that certain configurations, modifications, applications, scripts, patches, or bug fixes will properly supply the functionality desired by the virtual computing resources and distributed applications within the virtualized computing service environment.

DETAILED DESCRIPTION

A technology is provided for testing of programs and computing resources on an operating system of a physical host or, alternatively, testing may occur on a computing instance in a service provider environment. A launcher may launch or identify an operating system on a physical host with a runner agent on the operating system, or the launcher may launch a computing instance in a service provider environment with a runner agent on the computing instance. Tests may be remotely invoked on the operating system or computing instance by calling the runner agent with a collection of test parameters or test contexts. The test context may include the test identifiers, test names, a location of the test code, a location to publish results and other input configuration information for the tests.

The runner agent may keep track of the progress made while executing tests. The runner agent may track overall test progress by writing a state of tests which are pending, in progress or completed. The test code executed by the runner agent may also be configured to keep track of progress made in execution of an individual test by writing test progress information to the test state. At a defined or undefined point in the test execution, a destructive event may occur. The destructive event may be a reboot of the operating system (or computing instance), a restart of a sub-system of the operating system, driver failure, an operating system crash, or any other event that leads to a computing component to malfunction. For example, the reboot may be deterministically triggered by test code (i.e., explicitly or purposefully triggered by the runner agent) or non-deterministically triggered by other software packages or events in the operating system at any point during test execution (i.e., triggered by other executables and install programs outside the test script and runner agent). Another example of a non-deterministic event may be an operating system crash that forces a reboot.

In the case where a reboot is purposefully triggered by test code (i.e., a deterministic call), the runner agent may first update and save the test state to a data store or a storage service, such as a block storage device, an object storage location, a physical disk or another persistent storage location. The stored test state may be used at a later point in time by the runner agent to identify a command or portion of the test code that is to be executed next, so that the test can continue running from the point it was interrupted because of the reboot. Additionally, the runner agent may create a scheduled task set to run upon the occurrence or after the occurrence of a start event. For example, a scheduled task may be a task triggered at a specific time (e.g., 8 minutes after the scheduled task is created) or a scheduled task may be triggered by an event (e.g., an operating system reboot). When a portion of the operating system re-starts or the entire operating system reboots, the scheduled task may be run in response to the start event for the reboot or re-start (or another triggering event), which in turn may re-launch the runner agent.

In a case where reboots occur non-deterministically, the runner agent may save a test state or progress to a data store, such as a block storage device (e.g., disk), at the beginning of a test (e.g., test script) and may create the scheduled task (e.g. a scheduled task that is launched upon operating system reboot) at the beginning of the test too. Upon a destructive event occurring for the operating system (e.g., a reboot) and the runner agent resuming, the runner agent may resume the test that was being executed using the test state obtained by querying external executables for a progress state (e.g., the operating system for an application install state, an installer for an install state, a driver for an active state, etc.) in a non-deterministic case. The test state may be used by the runner agent to select a point in test code to resume the test.

This technology enables the testing of applications, programs, and computing environments that reside on computers, operating systems, or computing instances that experience reboots during testing. When an operating system or computing instance is rebooted, the context for an executing test may be lost. This lost context may also include lost test context for the runner agent (or program) that executes the test code, as a result of the runner agent being shut down or negatively impacted by the reboot or a sub-system restart which may disable or corrupt the test and/or runner agent. Since the reboots may cause terminations or interruptions in the execution flow of a test and lost test state and/or test context, this state may be restored using scheduled tasks and saved or queried test states to re-start the runner agent.

Figure 1:
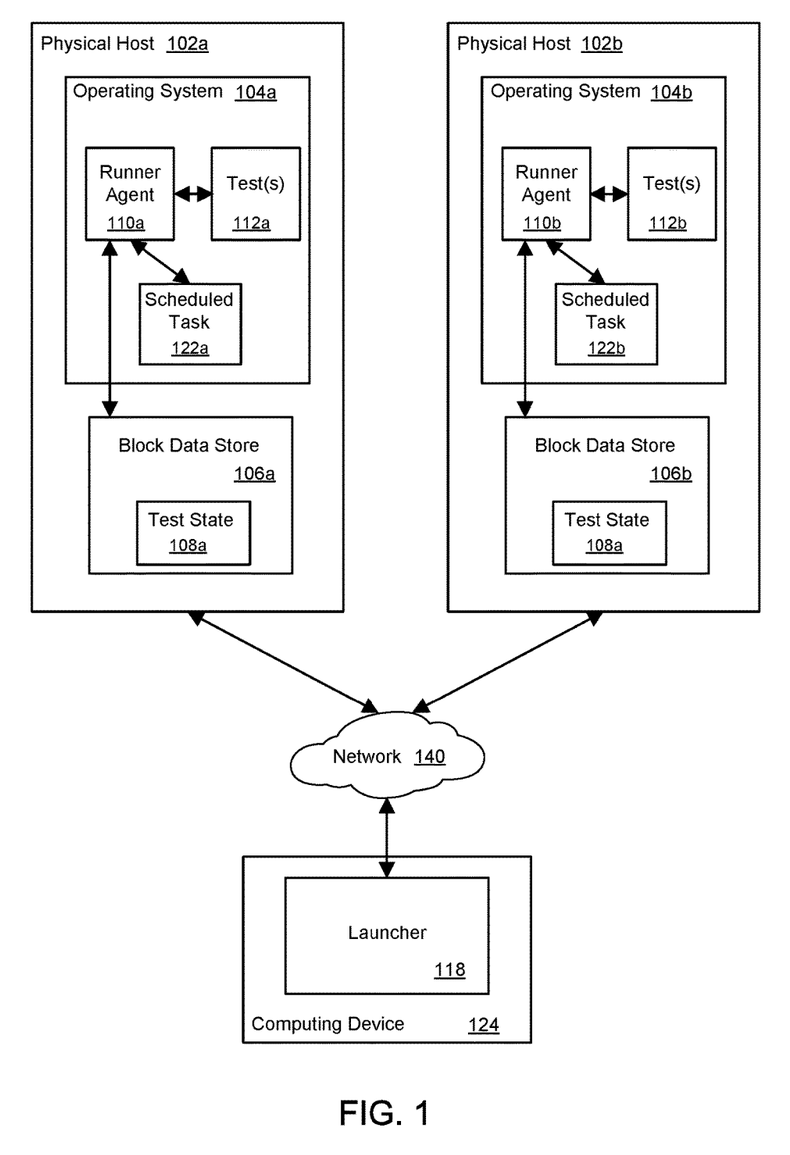
FIG. 1 is a block diagram illustrating an example system for resuming testing operations in an operating system after a destructive event occurs.

FIG. 1 illustrates a system for restoring or resuming a test on an operating system 104a after a destructive event related to the operating system 104a. The operating system 104a may be executing on a physical host 102a. The operating system 104a may have access to a data store, such as a block data store 106a, and the block data store 106a may be a mass data storage device such as hard drive, Flash RAM, or another persistent storage device. In addition, the block data store 106a may be a root volume for the operating system. In an alternative configuration, the data store or block data store 106a may be provided by a virtualized block storage service that provides data storage services over a network, but that look like they are local to operating system, for example using API calls to the service.

A runner agent 110a may be provided to execute on the operating system 104a and the runner agent 110a may be used to launch tests 112a-b executed on the operating system 104a. The tests 112a-b may be tests of operations performed by programs or applications on the operating system 104a. For example, the test may include the launching and related testing of programs and other functions on the operating system 104a. For example, the tests may execute applications, install drivers, perform functions on applications, send out communications, install applications, simulate application usage, etc.

The block data store 106a may be used to receive and record a test state 108a for a test that is being performed by the runner agent 110a. As portions of a test 112a are completed and the test state 108a changes, the test state 108a may be recorded to the block data store 106a. More specifically, the test code may write additional information to the test state 108a as determined by instructions in the test code. Alternatively, the test state 108a may be programmatically saved by the runner agent 110a as the state changes, for example at regular intervals. The test state 108a may include recording a test state 108a of the test code and a context of the state. Storing of the test context may include storing parameters that are passed to the runner agent 110a to restart the runner agent 110a. Example of parameters may be: test types, test identifiers, test parameters, test scripts, etc., and these parameters may be stored in key value pairs. The key value pairs may be stored in a configuration file, a relational data store, a NoSQL data store or another type of data format. Thus, the test parameters may contain the input parameters used for a test to resume.

A computing device 124 may be in communication with the physical hosts 102a-b via a network 140. The computing device 124 may be a standalone computer, such as a desktop computer, a laptop or another type of computing device. The computing device 124 may be configured to execute a launcher 118 which may be managed by a user or administrator of the tests. The launcher 118 may define a plurality of test pipelines having test parameter combinations. These test parameter combinations may be launched as tests 112a-b on the operating system 104a. The launcher 118 may launch the runner agent 110a with the test parameter combinations on the operating system 104a of the physical host 102a. The tests 112a-b to be applied by the runner agent 110a may be defined using the launcher 118.

As discussed earlier, the runner agent 110a may initiate the tests 112a-b on an operating system 104a hosted on the physical host 102a, and the runner agent 110a may record a test state in a block data store 106a as the test state changes or proceeds during test execution. The reason for recording the test state 108a is that deterministic or non-deterministic destructive events may occur during the course of the test. A destructive event may be an event that occurs which disrupts the operation of the runner agent 110a and stops the test 112a. For example, the destructive event may be a reboot of the operating system 104a or a restart of a portion of an operating subsystem, such as a restart of a communications subsystem (e.g. a network interface or network driver), storage subsystem, networking subsystem or another operating system subsystem.

A reboot may be performed from within test code by explicitly calling a reboot function. This may be considered a deterministic call of a reboot function. Tests being performed sometimes perform a reboot as part of completing the test execution. In a deterministic configuration, the tests are responsible for providing the ability for the test code e.g., a test script) to be resumed. This means the tests 112a-b and/or the runner agent 110a are configured record information about the test state 108a, so that tests can resume or be idempotent when a destructive event occurs. This process for resuming tests may be repeated for any of number of reboots or re-starts.

To summarize the deterministic configuration process, a destructive event may be intentionally called. Accordingly, a test script of a runner agent 110a may save a test state 108a to a block data store 106a or another persistent storage device. A scheduled task 122a may then be created on the operating system 104a.

The scheduled task 122a may be an event-based job scheduled on the operating system 104a. An operating system 104a may have a task scheduler that is provided with a commercial version of the operating system 104a that may be accessed by the runner agent 110a. Alternatively, a third party task scheduler may be loaded onto the operating system 104a after the operating system 104a is purchased or loaded on the physical host 102a. For example, the runner agent 110a may load the task scheduler. The task scheduler may also be a custom task scheduler that has been developed for scheduling of tasks for testing purposes. In one example, the task scheduler may be a daemon (e.g., a cron daemon in a UNIX system) that can incorporate an operating system event, application event, or a time event into a scheduled task 122a to initiate the restart of the runner agent 110a.

The scheduled task 122a may be configured to be triggered when a particular event occurs in the operating system 104a. As discussed previously, one such event may be a start event for an operating system 104a triggered after the destructive event that was an operating system reboot. Another type of event may be a time event (e.g., start the scheduled task in 5 minutes after a deterministic reboot is expected to have completed). The destructive event may also be a sub-system restart where a subsystem of an operating system is restarted. Examples of such sub-systems may be networking subsystems (e.g., network adapters), data store connection subsystems (e.g., database connections), graphics subsystems, wireless communication subsystems (e.g., wireless cards like Wi-Fi, Bluetooth and NFC (near field communications)), mass storage subsystems, printing device subsystems, power saving subsystems, input/output (I/O) subsystems and other subsystems that are part of the operating system 104a. Resilience to other destructive events such as operating system hibernation, operating system crashing or a power failure are provided by this technology.

Next in the deterministic process, a reboot may be explicitly invoked by the test. The scheduled task 122a may be created in the operating system 104a when the test script starts or explicitly before the destructive event is called.

In a non-deterministic configuration, the destructive events (e.g., reboots) may happen at unpredictable or even unintended points in time. However, the fact that a non-deterministic destructive event (e.g., reboot) will occur in the test script may be known to the creator of a test script but when such destructive events are going to occur may not be known. This non-deterministic nature of the test may be flagged at the beginning of the test script and a scheduled task 122a may be created when the test starts. Thus, when the destructive event occurs, the system may be able to resume. In one example, the destructive event may be an operating system 104a crash. If a test administrator believes a crash may occur in test code or has seen a crash occur in test code, then the test may be flagged too.

The number of reboots that occur may also be non-deterministic because the test and/or test code may not know in advance the number of times external programs or applications may need to reboot to complete the test instructions (e.g. installing a Windows driver might use a non-deterministic reboot). In addition, the non-deterministic reboots themselves maybe triggered at any point during test execution.

Examples of test setup and test pseudo code is listed in Pseudo-Code Listing A and B. The deterministic case is shown first where the test state is set and captured before the reboot is explicitly called in the script.

Pseudo-Code Listing A
Example of Test—Deterministic
------------------------------------

Function Setup.Doctor {
Param (
[system.collections.generic.dictionary[[string],[object]]]
    $State
)
}
Function Cleanup.Doctor {
Param (
[system.collections.generic.dictionary[[string],[object]]]
    $State
)
}
Function Test.Doctor {
Param (
[system.collections.generic.dictionary[[string],[object]]]
    $State

Get the Initial phase
$phase=$State['Phase']
switch ($phase) {
"Phase1" {
Do phase 1 stuff
$State['Phase']="Phase2"
Reboot
}
"Phase2" {
Do phase 2 stuff
$State['Phase']="Phase3"
}
}
}

In the non-deterministic configuration of pseudo-code listing B (below), a marker or flag is presented (e.g. "#This command may require arbitrary number of reboots") that may signify that reboots may occur but the test does not know when the reboots will occur or how many reboots will occur. In this case, the state may be stored to memory or storage before the test code starts and a scheduled task may be created before the test code starts. Then the test code may be started. By using a configuration flag in a test script that states that the test may have a non-deterministic destructive event (e.g., a reboot) the framework or runner agent 110a may be notified that the test state 108a is to be recorded as the test starts. The framework and the runner agent may also know that a scheduled task may be set before the test runs in order to prepare for the non-deterministic reboot.

When the start event (or another related event) is received (e.g., by the operating system 104a or by a system utility on the operating system 104a) to trigger the resuming of the runner agent 110a from a reboot or another destructive event, then the action the scheduled task 122a may take is to either run a command or script to resume the runner agent 110a.

In the non-deterministic case of Pseudo-Code Listing B, the scheduled task 122a may restart the runner agent 110a and test and then the runner agent 110a may check an external state (e.g., a driver install state). For example, the reboot may have occurred when installing a new piece of software during testing and a request may be made to the operating system 104a or a driver to determine whether the driver has competed installing and reached a ready state. Similarly, the install state for an application may be requested and use to control the state of the test script. This external state can be checked because the test may not have to opportunity to store the state because the test does not know when the reboot will occur or how many reboots with occur. These reboots are initiated from a piece of software that is being installed, such as: a driver installer, an operating system update installer, an application package installer or another program that may invoke one or more destructive events (e.g., reboots). Thus, the state can be obtained from an external state check because the programs external to the runner agent 110-b and test 112a are invoking the reboot operations. Alternatively and by way of comparison, in the deterministic state, if the test state was saved periodically, that state may be retrieved and used to resume the test.

Pseudo-Code Listing B
Example of Test—Non-Deterministic
------------------------------------

Function Setup.DriverTest {
Param (
[system.collections.generic.dictionary[[string],[object]]]
    $State
)

```
# This command may require arbitrary number of reboots
Install-PVDriver
}
Function Cleanup.DriverTest {
Param (
[system.collections.generic.dictionary[[string],[object]]]
    $State
)
}
Function Test.DriverTest {
Param (
[system.collections.generic.dictionary[[string], [object]]]
    $State
)
# Get the state externally
$driverInstallState=Get-DriverInstallState
switch ($driverinstallState) {
"Installed" {
# Start driver verification logic
}
"Pending" {
# Driver isn't installed yet, install probably has reboots
    left
}
}
}
```

In an alternative configuration, the scheduled task 122a may be created containing information identifying the command or portion of the test code that was being executed at the time a reboot or re-start was deterministically invoked. In other words, the test parameters for the runner agent 110a may be stored with the scheduled task 122a. This allows the runner agent 110a to be restarted and be passed the parameter of the command or test state. The runner agent 110a may then resume the test 112a from the point defined by the parameter from the scheduled task 122a. Providing the test state 108a or current command, as part of the parameters to re-start the runner agent 110a, may avoid the operation of reading the test state 108a from a separate persistent storage location because the test state 108a may be stored with the scheduled task 122a on the root volume of the operating system 104a that has experienced the reboot or other destructive event. In such configurations, the resources (e.g., root volume) for the operating system 104a may be available so that the operating system 104a can restart and re-launch the runner agent 110a.

The state to be stored may include a test state 108a and test context recorded to a persistent memory. In one configuration, the test state 108a may be saved to a block storage device or a virtualized block storage service. In many cases, the state may be stored to a root volume which will not be impacted or modified by a destructive event. The state may be a file that contains the test state 108a and test context for the test state 108a, and this state information may be state variables in a state dictionary. For example, a test state variable or variables may store states that represent that the state is in phase 1, phase 2, phase 3, etc. The test context may include a test ID, a test name, test parameters, metadata, and related test information.

The present technology may also be used for testing many types of computing and networking devices that include an operating system such as: load balancers, proxy servers, NAT (network address translation) servers, smart hubs, smart network devices and other computing devices. Embedded devices, Internet of Things (IoT) devices, or virtually any computing device that includes an operating system 104a which supports a scheduled task (which may be used to re-start a runner agent 110a and load a test state 108a) may be tested using the technology described.

Figure 2:
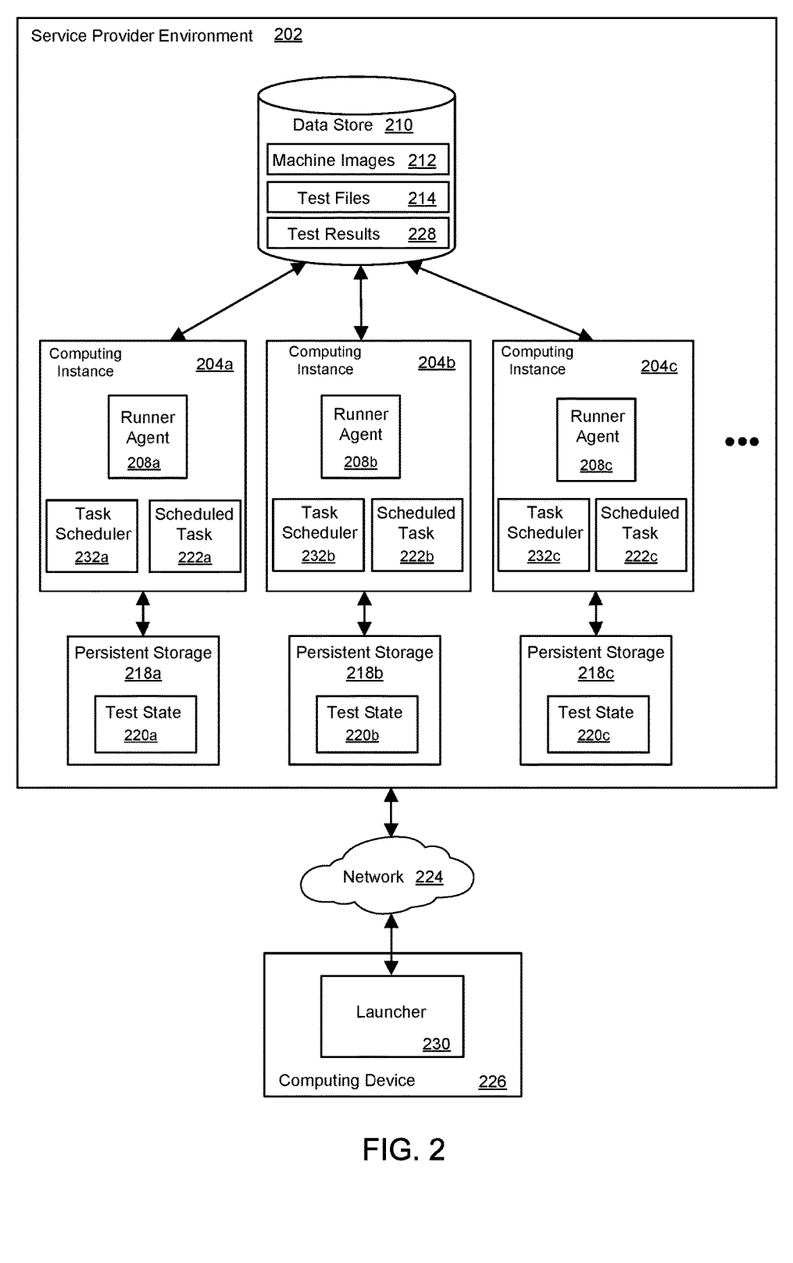
FIG. 2 is a block diagram illustrating an example system for resuming testing operations in a computing instance of a service provider environment after a destructive event occurs.

FIG. 2 illustrates a system for restoring or resuming a test on a computing instance 204a after a destructive event has occurred and the destructive event is related to the computing instance 204a. More specifically, the system may resume synchronous testing operations for a computing instance 204a in a service provider environment 202 after a destructive event occurs. The computing instance 204a may be executing in a service provider environment 202 that publicly provides virtualized computing services to customers. The service provider environment 202 may have a plurality of computing instances 204a-c executing on physical hosts (as shown in FIG. 1), and the computing instances 204a-c may include one or more runner agents 208a-c configured to perform synchronous testing.

The runner agents 208a-c may each be in communication with persistent storage locations 218a-c, which record a test state 222a for a test being performed by a runner agent 208a. The persistent storage location 218a may be a virtualized block storage service or virtualized data storage system that may be accessed via web service calls or REST APIs (representational state transfer application program interfaces). In another example, the persistent storage location 218a may be an object storage location in a data storage service that is accessed via a virtual network within the service provider environment 202. In one example, the test state 220a may be recorded by storing the test state in a root volume data store of a computing instance 204a.

A computing device 226 may be provided which is in communication with the service provider environment 202 via a network 224 (e.g., the internet or a wide area network). The computing device 226 may include a launcher 230 to define a plurality of test pipelines having test parameter combinations. The launcher 230 may launch a runner agent 208a with the test parameter combinations sent to the computing instance 204a in the service provider environment 202. Then the test may be applied to the computing instance 208a as defined by the launcher 230.

In service provider environments 202, a launch script may also be sent to the computing instance 204a that runs when the computing instance 204a is launched. This launch script may load the runner agent 208a, provide the test parameters, and perform other initial configuration for the computing instance 204a. In the past when a destructive event has occurred, then the computing instance 204a cannot load the runner agent 208a again because the initial loading script does not execute again in the service provider environment 202. Thus, this technology overcomes this issue by using the scheduled task 222a created and managed by a task scheduler 232a.

A relationship between the scheduled task 222a and the destructive event is indirect because the scheduled task 222a is set up in the computing instance 204a (or alternatively in an operating system in a direct hardware execution case) by the runner agent 208a in order to later respond to an operating system event in the computing instance 204a after the destructive event has occurred, but the scheduled task 222a is setup in advance of the destructive event occurring. Thus, the runner agent 208a may setup the scheduled task 222a at the beginning of a test script or during a test script, but a little later a destructive event may occur. Whether this destructive event occurs explicitly or implicitly, the destructive event will stop or interrupt the runner agent 208a, the entire computing instance 204a and/or the test. In the case of an operating system reboot or another serious failure, nothing further will occur until the task scheduler 232a of the operating system detects an event for which a scheduled task 222a may be started (e.g., a reboot or restart event). Additional examples of events the computing instance 204a may detect may include operating system event or time events (e.g., start the scheduled task at 2:00 pm or 20 minutes later than the test script started). The scheduled task 222a may in turn start the runner agent 208a which may in turn restart the test. It is the earlier setup of the scheduled task 222a that allows the operating system to "remember" to restart the runner agent 208a and thereby resume the interrupted test.

After a destructive event and after the runner agent 208a has been re-launched, the runner agent 208a may resume the test on the computing instance 204a. The runner agent 208a may record a test state 222a in the persistent storage location 218a at various times as the test executes. Later, the test state 222a may be used to select a portion of test code that is to be executed by the runner agent 208a after the destructive event.

A scheduled task 222a may also be set by the runner agent 208a to run on the computing instance on occurrence of a start event for a portion of the computing instance. When the scheduled task 222a is activated upon receipt of a start event by the task scheduler 232b or the operating system of the computing instance 204a, the scheduled task 222a may be configured to re-launch the runner agent 208a.

The runner agent 208a may identify and load the test state 222a after a destructive event occurs that may affect the runner agent 208a, and after the runner agent 208a has been restarted using the scheduled task 222a activated by the start event via the task scheduler 232a for the computing instance 204a or at least a portion of the operating system. The scheduled task 222a may be an event-based job or a time-based job scheduled on the computing instance 204a. Specifically, the scheduled task 222a may be configured to re-start the runner agent 208a. The runner agent 208a may then execute a command for a state set when the destructive event occurred using the test state 222a that was recorded. For example, the start event may be triggered after the destructive event occurred that was a computing instance reboot or a computing instance sub-system restart. Examples of sub-system restarts may include: a network communication interface restart, a data store connection restart, or a container restart.

The destructive event may be initiated as part of the test by rebooting the operating system explicitly or deterministically using the runner agent 208a to make an explicit call to reboot the computing instance 204a.

In a non-deterministic configuration, the test state 222a may be obtained using a call to external software outside the runner agent 208a via an operating system. For example, the test state 222a may be obtained using the call to external software that is a device driver or an application to determine whether an install package has reached a ready state. If a software driver is being installed, then the state of that software driver can be obtained and the state obtained may be used to select a portion of the test code for resuming the test.

A data store 210 in the service provider environment 202 may contain machine images 212 used for launching the computing instances. In addition, the data store 210 may contain test files 214 with the test parameters to be sent to a computing instance 204a. Once a test is complete, test results 228 may be written by the runner agent 208a to an object storage service.

This present technology provides many useful results. The recovery of the testing framework as managed by the runner agent 208a with respect to a reboot is handled by the testing framework and individual tests need not deal with that recovery complexity. At all points in the testing process, the testing framework may be in control via the runner agent 208a and the launcher 230, and this results in the right information being captured in the test logs and the logs will be complete without data loss. Further, the logs may have the right pass/fail information because the management of the destructive events in the present technology may avoid the creation of inaccuracies in the logs. In the past, when the operating system was rebooted or a sub-system of the operating system was restarted, the test states and the state of the logs were not considered to be reliable. For example, if the previously existing testing frameworks needed to deal with a reboot, the previously existing testing frameworks may not be able recover after the reboot. In this case, the logs may not be complete and the entire testing system may be unreliable to end users. In contrast, the technology described provides a reliable testing system even in the event of destructive events for the operating system or subsystems of the operating system.

As an additional result, the present technology simplifies both the defining of the tests and also implementation of test code that uses a reboot or another destructive event. This technology provides a way deal with destructive events that may occur during testing by structuring test code to deal with destructive events. A code template may be provided to create tests for both deterministic and non-deterministic destructive events. In addition, the technology provides the ability for a testing administrator to resume tests after a destructive event as part of the testing framework. The tests may also be written in a phased manner so that the state may be used to resume the appropriate portion of the test, and the test can resume where the test left off when the destructive event occurred. In addition, the runner agent 208a may remain a light weight process and the runner agents 208a-c may undertake of any number of tests launched for the launcher because the launcher is not waiting for completion of tests.

Figure 3:
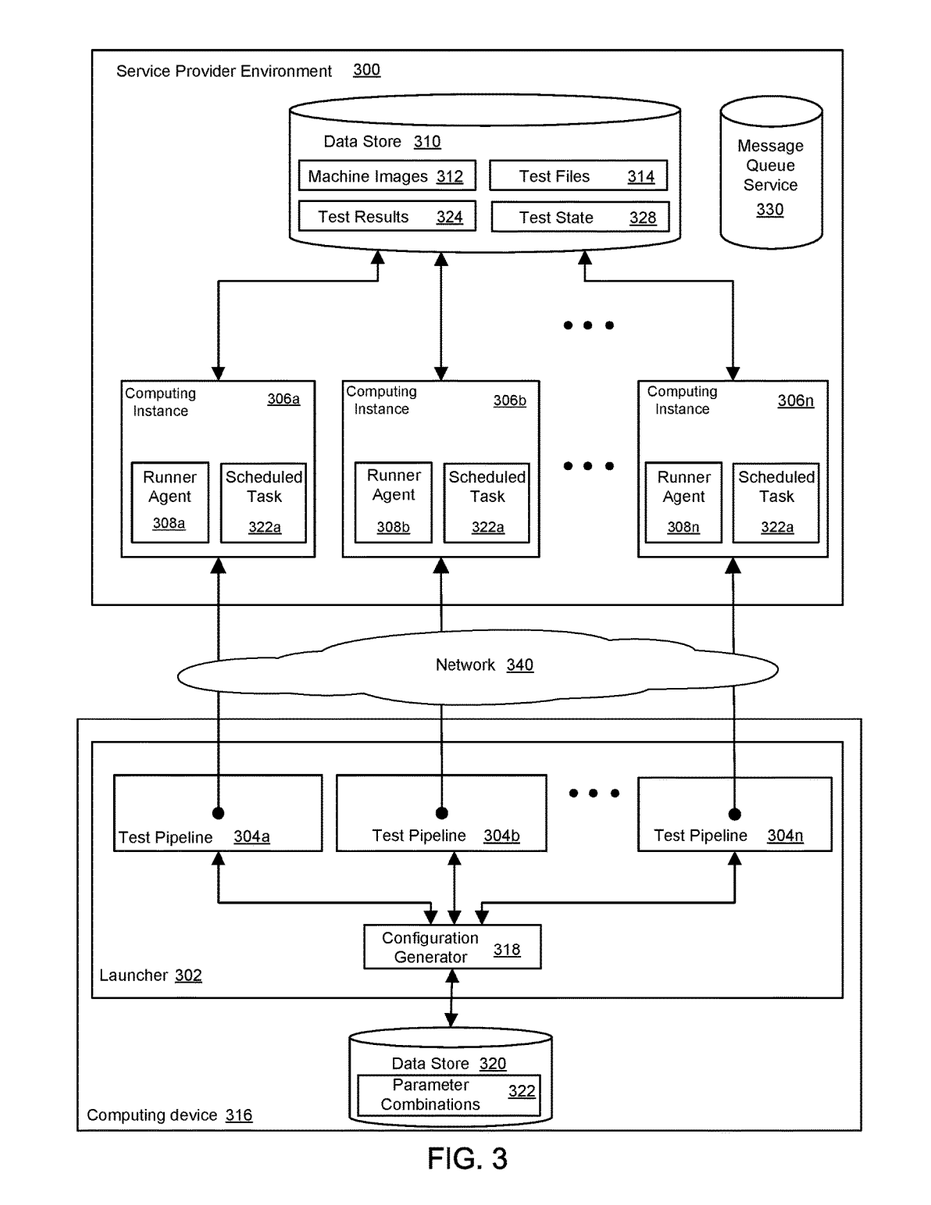
FIG. 3 is a block diagram illustrating an example service provider environment in which tests can be executed in accordance with an example of the technology.

FIG. 3 is a block diagram illustrating an example of a service provider environment 300 or virtual computing environment in which tests may be executed and resumed, and an example of a computing device 316 on which a launcher 302 can be executed. A configuration generator 318 may identify parameter combinations 323 based on a user-provided patterns, definitions, or functions. The parameter combinations 323 may be stored in a data store 320 at the computing device 316.

The launcher 302 may use test pipelines 304a-n to facilitate testing using the parameter combinations 323. While only three test pipelines are shown in FIG. 3, any number of test pipelines may be initiated by the launcher 302. The launcher 302 may load a configuration and test from the configuration generator 318 and may assign a respective parameter combination to each of the test pipelines 304a-n. The launcher 302 may assign parameter combinations to the test pipelines 304a-n sequentially or based on ranks or priorities assigned to the parameter combinations. A more detailed discussion of test parameters, test combinations, test permutations, parameter combinations, formal parameters, and actual parameters used for tests is provided in patent application Ser. No. 15/084,434 filed on Mar. 29, 2016 which is incorporated by reference.

A communication may be sent through a network 340 by the launcher 302 for each of the test pipelines 304a-n in order to initiate the creation of a computing instance in the virtual computing environment 300 based on a configuration identified by the test pipeline's respective parameter combination. The data in test pipeline 304a, for example, may be used by the launcher 302 to initiate the creation of a first computing instance 306a, while data in test pipeline 304b may be used to initiate the creation of a second computing instance 306b, data in test pipeline 304n may be used initiate the creation of an Nth computing instance 306n, and so forth. The computing instances 306a-n may be created using machine images 312 from the data store 310.

Each of the computing instances 306a-n may execute a respective runner agent 308a-n to run a test from the launcher 302 for a test pipeline 304a through which the computing instance 306a may be tested. A first computing instance 306a, for example, may execute runner agent 308a, a second computing instance 306b may execute runner agent 308b, an Nth computing instance 306n may execute runner agent 308n, and so forth. Each of the runner agents 308a-n may retrieve one or more tests from the test files 314 and execute the one or more tests in accordance with the parameter combination provided to the runner agent's corresponding test pipeline. Information produced as a result of the tests run by the runner agents 308a-n can be stored as the test results 324 in the data store 310.

The tests may use a scheduled task 322a created in the computing instance 306a to enable a runner agent 308a to be re-launched and to enable the test to be resumed at a recorded test state 328. The test state 328 may be in a root volume of the computing instance 306a as stored in: an elastic block storage service, a NoSQL data store, an addressable object data store, or another data store service available to the computing instances 306a-n. More specifically, the test state 328 may be used to resume a test at the appropriate point in a test script. In addition, the test state 328 may persist when a destructive event occurs so the test state is not lost.

Each of the test pipelines 304a-n may include an overall test state that is currently assigned to the test pipeline. In one example, each of the test pipelines 304a-n may include one of three possible overall states. One of the three overall states may indicate that the test is being set up (e.g., an instance with the configuration is being created), while another overall state may indicate that the test is currently in progress. The third overall state may indicate that the test has been completed. In an alternative configuration, the overall test state may be: launching, running, completed and done (e.g., the done state may indicate that cleanup should be performed and/or another test should be loaded).

In an alternative configuration of the technology, three test pipelines or queues may be maintained that hold the tests. The three test pipelines may be a pending test pipeline, a running test pipeline, and a done test pipeline containing multiple configuration files associated with individual tests. A configuration file (and test) may move or transition from the pending test pipeline to the running test pipeline to the done test pipeline (e.g., queue), as the configuration transitions from waiting to launch states, launched to running states, and launched to terminated states, respectively. Thus, each test pipeline may hold many configuration files that are in a single state as opposed to putting one configuration and test into each test pipeline and tracking the multiple states in the test pipeline.

When the runner agent 308a of a computing instance 306a corresponding to a particular test pipeline has completed running a test, the launcher 302 can send a communication to the configuration generator 118 indicating that the test pipeline is ready to receive another test configuration (e.g., parameter combination). For example, if runner agent 308a completes a test, the launcher 302 may request the test state from a computing instance 106a and the launcher 302 may identify a message indicating the test's completion, and then the test state 328 in the test pipeline 304a may be changed.

In one example of an alternative communication channel configuration, the launcher 302 may depend on an external queue in a message queue service 330 to obtain communications regarding the progress of test execution. When a test completes execution, the runner agent 308a may write a message to a message queue in a message queueing service 330 stating that the test has completed. The launcher 302 may poll the message queue service 330 for such messages. The message queue in the message queue service 330 may allow the communication between the launcher 302 and the runner agent 308a to be decoupled from the availability of the runner agent 308a (and the operating system or computing instance) and therefore the launcher 302 may be more resilient to any runner agent 308a instability (e.g., rebooting, etc.). The message queue service 330 may be a highly available messaging cluster, a publish/subscribe type of message service, a NoSQL data store service or another type of messaging service. Some messaging services useful in this scenario are configured to occasionally receive a write message but then to be polled frequently for message updates. Using an asynchronous type of message service as an intermediate communication channel enables the launcher 302 to communicate with the runner agents 308a-n regardless of whether the runner agent is available or unavailable. Accordingly, the runner agent 308a may be run in complete isolation.

During a destructive event, the runner agent 308a and test code may be terminated and the launcher may lose communication with the runner agent 308a and the computing instance 306a. In prior testing frameworks, a lack of communication may result in the problem where the launcher cannot even check the status of a test. This technology provides a configuration where the launcher can check for test completion even where the runner agent 308a is rebooting or crashed.

The launcher 302 can then send a communication to the configuration generator 318 indicating that the test pipeline 304a is ready for another parameter combination. The configuration generator 318 may then assign another parameter combination from the parameter combinations 323 to the test pipeline 304a, and the assignment may be based on a priority or a rank of the parameter combination. If the parameter combination calls for a computing instance with the same configuration as the computing instance 306a, the computing instance 306a and the runner agent 308a may, in some cases, be re-used. Otherwise, the test pipeline 304a may delete and replace the computing instance 306a with another computing instance that has the configuration for the parameter combination and repeat the testing process described above with respect to the test pipelines 304a-n.

In one example, a user may wish to apply qualification testing to virtual computing resources in a virtual computing environment. The term "qualification testing," in the context of the present disclosure, can refer to a process by which an engineer executes a series of tests (e.g., automated tests) against virtual computing resources (e.g., computing instances). Qualification testing can be used, for example, to measure, validate, and quantify the quality of the resources that are tested. A qualification testing plan may include, for example, a collection of predefined tests and associated criteria by which a computing resource's performance on the predefined tests is to be measured.

Since the tests being executed may involve one or many destructive events (e.g., reboots) for a computing instance or operating system, this present technology provides a way to deal with those deterministic or non-deterministic destructive events. The destructive events or reboots may be invoked by the test or they may be invoked by software being launched or installed by the test. As a result, this technology can address both the deterministic or non-deterministic destructive events. The present technology enables a test to be cleanly resumed from where the test left off without any intervention from the launcher.

Figure 4:
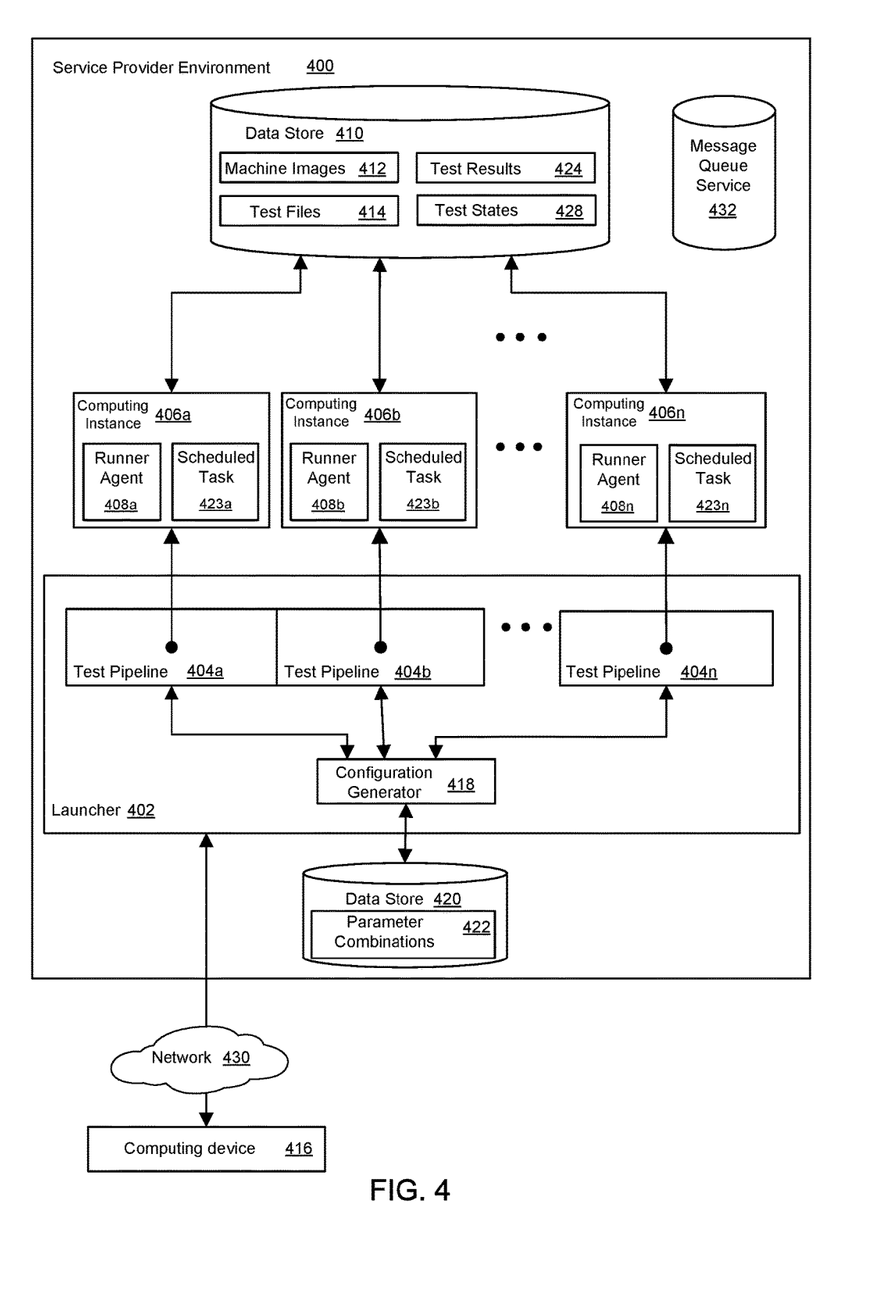
FIG. 4 is a block diagram illustrating an example service provider environment in which testing instructions can be provided from a computing device in accordance with an example of the technology.

FIG. 4 is a block diagram illustrating an example of a service provider environment 400 in which testing protocols may be provided using user input. In the example of FIG. 4, the launcher 402 is executed in the service provider environment 400 rather than on the computing device 416. The launcher 402 may run on a computing instance in the virtual computing environment 400 or may be part of a managed service in the virtual computing environment 400. A user can interface with the launcher 402 from the computing device 416 via a network 430.

A configuration generator 418 may generate parameter combinations 422 based on a user-provided pattern, definition, or function. The parameter combinations 422 may be stored in a data store 420 in the virtual computing environment 400. The launcher 402 may use test pipelines 404a-n to facilitate testing using the parameter combinations 422. While only three test pipelines are shown in FIG. 4, it is to be understood that greater or fewer numbers of test pipelines may be initiated by the configuration generator 418. The configuration generator 418 may assign a respective parameter combination to each of the test pipelines 404a-n. The configuration generator 418 may also assign parameter combinations to the test pipelines 404a-n sequentially or based on ranks or priorities assigned to the parameter combinations.

Each of the test pipelines 404a-n may be used to initiate the creation of a computing instance in the virtual computing environment 400 based on a configuration identified by the test pipeline's respective parameter combination. Test pipeline 404a for example, may be used to initiate the creation of computing instance 406a, test pipeline 404b may be used to initiate the creation of computing instance 406b, test pipeline 404n may be used to initiate the creation of computing instance 406n, and so forth. The computing instances 406a-n may be created using machine images 412 from the data store 410. Each of the computing instances 406a-n may execute a runner agent 408a-n to run a test for the test pipeline to which the computing instance 406a-n corresponds. Computing instance 406a, for example, may execute runner agent 408a, computing instance 406b may execute runner agent 408b, computing instance 406c may execute runner agent 408c, computing instance 406n may execute runner agent 408n, and so forth.

The runner agents 408a-n may retrieve one or more tests from the test files 414 and execute the one or more tests in accordance with the parameter combination provided to the runner agent's corresponding test pipeline. The tests as executed by the runner agents 408a-n may be configured to support the occurrence of destructive events by setting scheduled tasks 423a-n and saving test states 428 as described previously. Information produced as a result of the tests run by the runner agents 408a-n may be stored as the test results 424 in the data store 410. For example, the data store 410 may be an object store that is a secure durable, distributed virtualized store which is accessible through a virtual computing environment.

The computing instances 406a-n, the runner agents 408a-n, and any computing instances being tested may, in some examples, be executed and/or tested in a customer's private virtualized computing environment (e.g., a "private cloud"). In other examples, the testing may be performed using a public cloud.

When the runner agent 408 of a computing instance 406a-n corresponding to a particular test pipeline has completed running a test, the launcher 402 can check the test pipeline 404a to determine that a test is complete and can send a communication to the configuration generator 418 indicating that the test pipeline is ready to receive another parameter combination. The launcher 402 can poll the message queue service 432 (as also illustrated in FIG. 3) to obtain the current test state as written there by the runner agent 408. In an alternative example, if the runner agent 408a completes a test, the computing instance 406a can inform the launcher 402 of the test's completion and the status of the test can be updated in the test pipeline 404a. The launcher 402 can then send a communication to the configuration generator 418 indicating that the test pipeline 404a is ready for another parameter combination. The configuration generator 418 may then assign another parameter combination from the parameter combinations 422 to the test pipeline 404a. In addition, the assignment may be based on a priority or a rank of the parameter combination.

Figure 5:
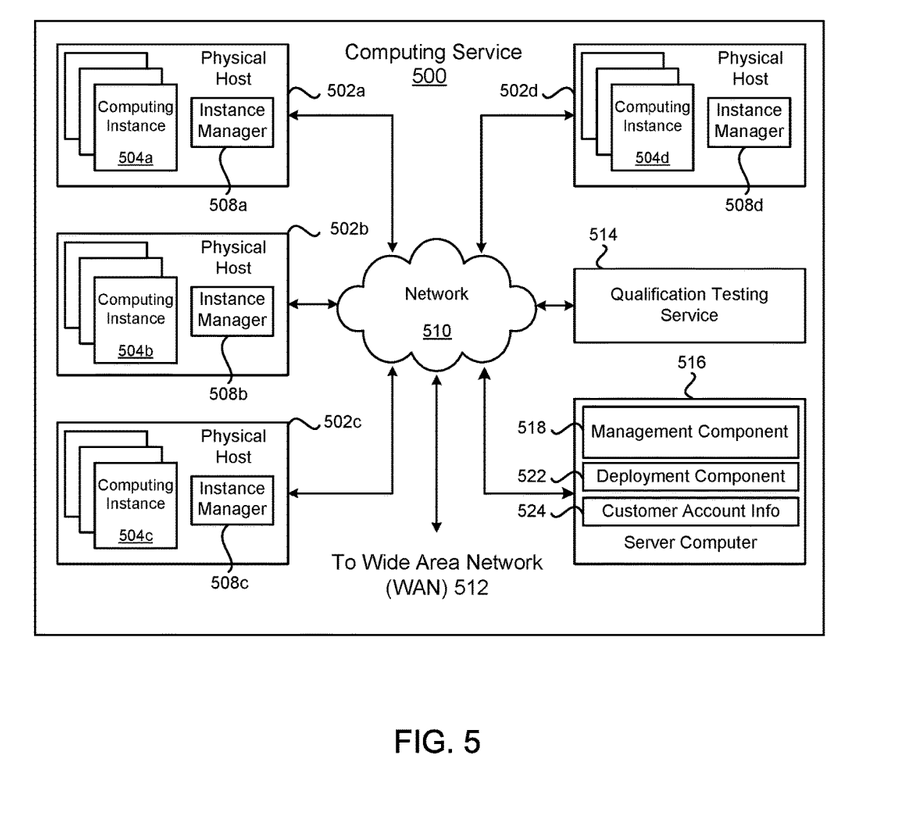
FIG. 5 is a block diagram illustrating another example service provider environment in which testing can be provided in accordance with an example of the technology.

FIG. 5 is a block diagram illustrating an example computing service 500 that may be used to execute and manage a number of computing instances 504a-d. The computing instances 504a-d may include the destination host described above. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running browsers or other lightweight client applications, for example. Those familiar with the art will recognize that the computing service 500 may be described as a "cloud" environment.

The particularly illustrated computing service 500 may include a plurality of server computers 502a-d. The server computers 502a-d may also be known as physical hosts. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

One or more server computers 514 and 516 may be reserved to execute software components for managing the operation of the computing service 500 and the computing instances 504a-d. In a further example, a server computer 514 may execute a qualification testing service that may perform testing functions as described earlier. In addition, the server computer 514 may include functionality of the launcher 118, 230 (as in FIG. 1 or FIG. 2). In addition, the computing instances 504a-d may include a runner agent.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache should be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 410 may be a local area network (LAN) and may be connected to a Wide Area Network (WAN) 512 or the Internet, so that end customers may access the computing service 500. The network topology illustrated in FIG. 5 has been simplified, as many more networks and networking devices may be utilized to interconnect the various computing systems disclosed herein.

Figure 6:
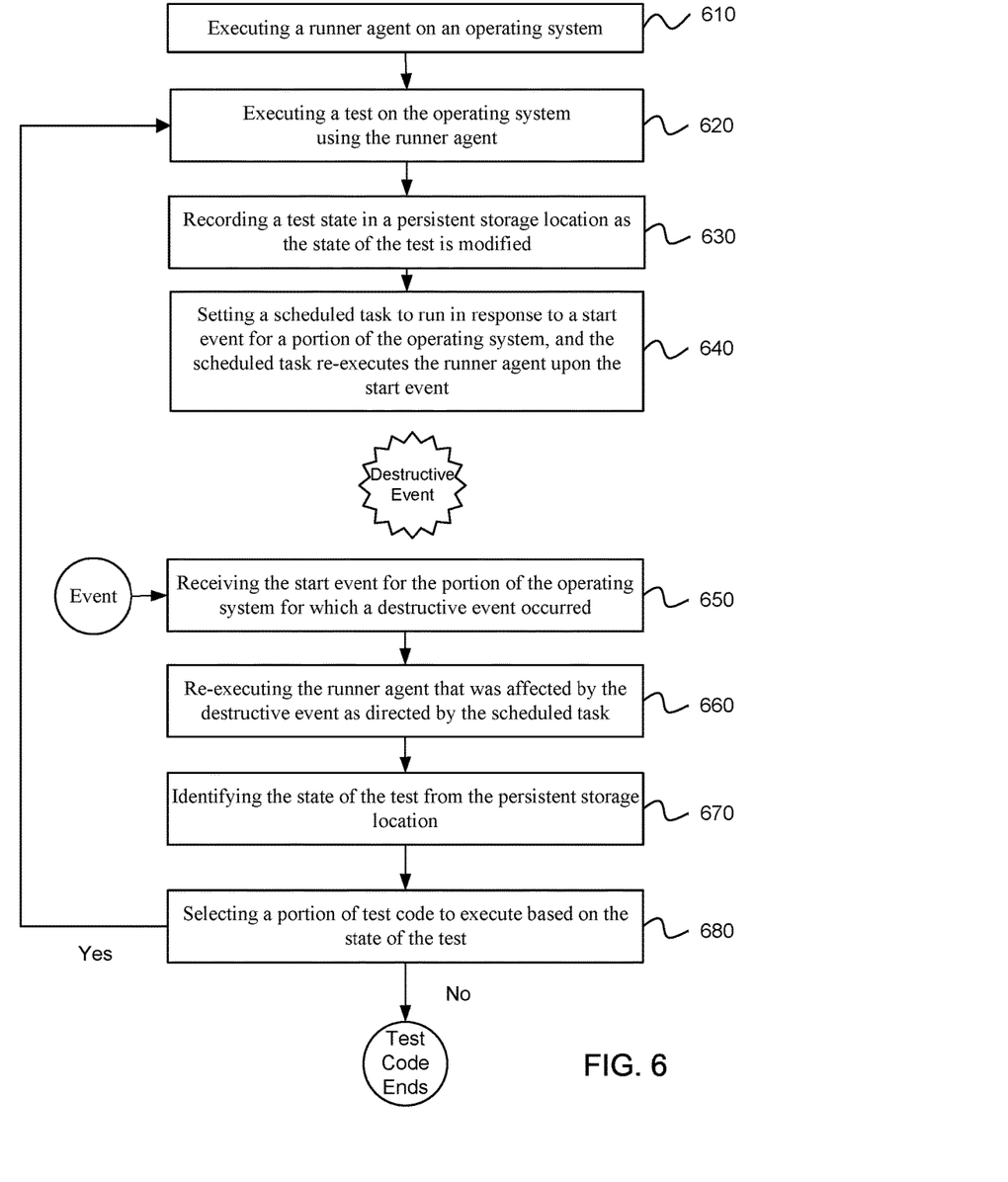
FIG. 6 is a flow chart illustrating resuming testing operations in a service provider environment after a destructive event occurs in accordance with an example of the technology.

FIG. 6 is a flowchart illustrating a method for resuming tests in an operating system of a computing device or computing instance in accordance with an example. The method may be implemented by a system comprising one or more processors and a memory device including instructions that, when executed by the one or more processors, perform the following operations discussed below. The operations described may be executed in any order while still maintaining the same functionality and output, as described.

The method may include the operation of executing a runner agent on an operating system, as in block 610. The runner agent may have been launched from a launcher on another computing device (e.g., a client device). The runner agent may be launched with test parameters passed to the runner agent via an operating system and from a launcher on the computing device. A test may then be executed on the operating system using the runner agent, as in block 620. The test may have testing parameters, and the test may be a test script that executes and performs testing functions for applications and processes on the operating system.

A test state may be recorded in a persistent storage location when the test state is modified, as in block 630. For example, the test state may be stored in a root volume data store of an operating system. The data store may also be an object store in a data storage service or an elastic block storage service in a service provider environment. A further operation in the method may be setting a scheduled task to run on occurrence of a start event for a portion of the operating system, as in block 640. The scheduled task may be an event-based job scheduled to be triggered on the operating system when an event is received. An example of an event is a start event that occurs after an operating system reboot or a start event for a sub-system of an operating system. The start event may activate scheduled task (i.e., the event-based job).

Another example of an event may be a time triggered event when a certain set time occurs (e.g., a time 3 minutes later than the test started). The scheduled task may be configured to re-execute the runner agent upon occurrence of the set time occurring. The event-based job or scheduled task may be created using a daemon (e.g. a cron daemon in UNIX) or a task scheduler (e.g., an event scheduler in a WINDOWS environment). In an alternative configuration, the event based job or scheduled task may be activated using a startup script for a computing instance that is configured to start each time a computing instance is instantiated and the startup script may be configured to start the scheduled task.

At some point a destructive event may occur. For example, the destructive event for an operating system may be a reboot or crash. Another type of destructive event may be in a sub-system of an operating system, such as: a network communication interface restart, a data store connection restart, or a container restart. The destructive events may be deterministic or non-deterministic, as described earlier. For example, an explicit call may be deterministically made to initiate the destructive event as part of the test by explicitly rebooting the operating system using the runner agent.

The start event may be received for the portion of the operating system for which a destructive event occurred, as in 650. The start event may be received by a task scheduler, a daemon, an operating system, a utility on the operating system, a user created utility on the operating system, etc. Further, the runner agent that was affected by the destructive event may be re-executed as directed by the scheduled task, as in block 660.

The test state may be identified from the persistent storage location, as in block 670. An additional operation is selecting a portion of test code to execute based in part on the test state, as in block 680. The test execution may then continue on from the point that was selected.

More generally, the test may be resumed where the test was interrupted in the test (e.g., test code or test commands) at a location or point identified based in part on the test state recorded prior to the destructive event occurring. The location identified may be the last completed portion of the test from which the test may resumed, the latest saved test state, or a similar location in the test. The test state may also be identified by looking at a log file and identifying or inferring the test state based on the state of the log file.

A return arrow in FIG. 6 illustrates a return flow where the test execution (e.g., progressive portions of a test script or multiple tests) may occur multiple times by further executing the test, as in block 620. In some cases, no further destructive events may occur or may be anticipated and the test execution may perform additional testing or administrative actions and then terminate. Thus, many testing operations and many destructive events may be executed or managed by the test(s).

In one configuration, the test state may be obtained by using a call to external software outside the runner agent. For example, the test state may be queried by making a call to the operating system to determine whether an install package has reached a ready or completed state. If an install package has reached the next appropriate state, then the test may resume. If the install package has not reached the next state yet, the test may also be programmed to wait a period of time and then re-query the operating system or install package as to whether the appropriate state has been reached.

A test script may also contain deterministic and non-deterministic events that may both occur. For example, a nondeterministic event may restart the test, whereas deterministic events in the same test script may resume the tests from specific points in the test code.

Figure 7:
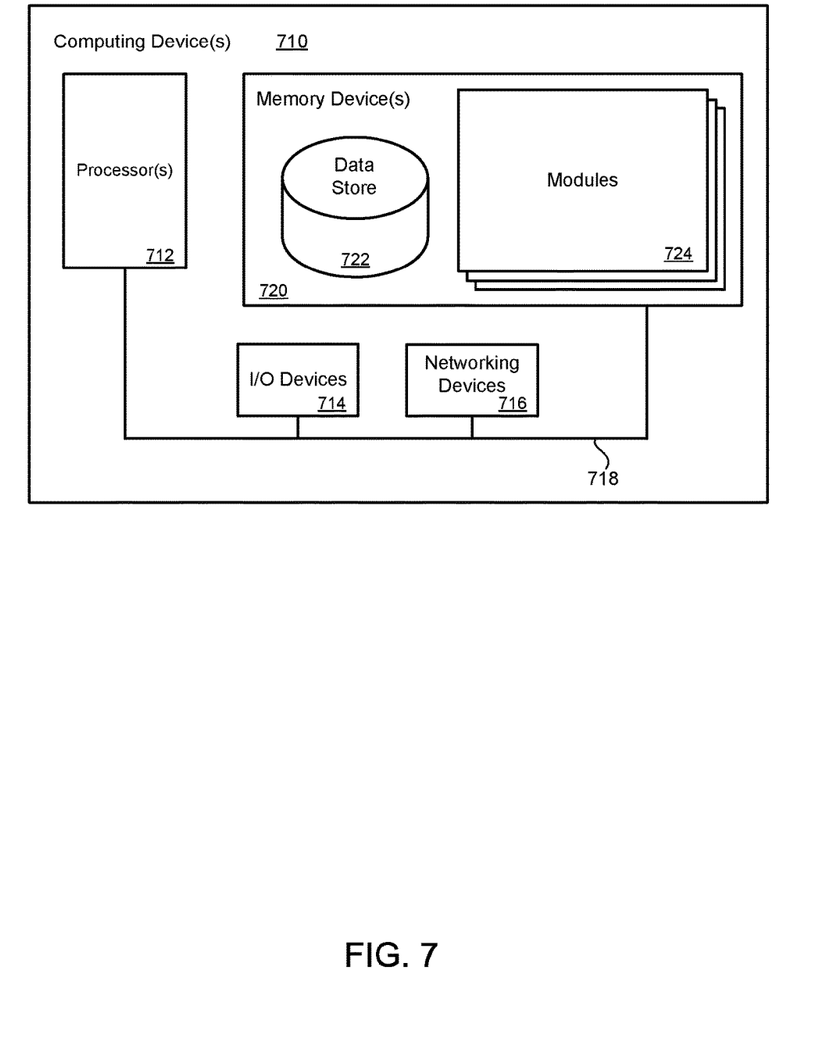
FIG. 7 is block diagram illustrating a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system to resume testing operations after a destructive event occurs, comprising:
   a service provider environment including a plurality of computing instances executing on physical hosts, wherein the computing instances include one or more runner agents configured to perform testing;
   a block data store in communication with a computing instance in the service provider environment, wherein the block data store records a test state being performed by a runner agent;
   a computing device in communication with the service provider environment via a network, the computing device including:
      a launcher to:
         define a plurality of test pipelines having test parameter combinations;
         launch the runner agent on the computing instance in the service provider environment;
         identify the test from the test parameter combinations to be applied to the computing instance as defined by the launcher;
      wherein the runner agent:
         initiates the test on an operating system of the computing instance;
         records a test state in the block data store;
         sets a scheduled task to run on occurrence of a start event for a portion of the operating system, wherein the scheduled task is configured to re-launch the runner agent;
         identifies the test state using the runner agent after the destructive event occurs and after the runner agent has been re-launched using the scheduled task; and
         executes a command based in part on the test state associated with the destructive event occurred.

2. The system as in claim 1, wherein the scheduled task is an event-based job scheduled on the computing instance.

3. The system as in claim 1, wherein the start event is triggered after the destructive event that was an operating system reboot has occurred.

4. The system as in claim 1, wherein a test state is recorded in the block data store as instructed when the test state changes.

5. A method, comprising:
   executing a runner agent on an operating system;
   executing a test using the runner agent;
   recording a test state in a persistent storage location when the test state changes;
   setting a scheduled task to run on occurrence of a start event, wherein the scheduled task re-executes the runner agent upon occurrence of the start event;
   receiving the start event for the portion of the operating system for which a destructive event occurred;
   re-executing the runner agent that was affected by the destructive event as directed by the scheduled task;
   identifying the test state from the persistent storage location; and
   resuming the test where the test was interrupted as identified based in part on the test state.

6. The method as in claim 5, further comprising executing the runner agent with test parameters passed to an operating system from a launcher on a separate computing device.

7. The method as in claim 5, wherein the scheduled task is an event-based job scheduled on the operating system.

8. The method as in claim 7, further comprising creating the event-based job using a daemon, startup script, or a task scheduler.

9. The method as in claim 5, further comprising receiving a start event after a destructive event has occurred, wherein the destructive event is an operating system reboot or an operating system sub-system re-start.

10. The method as in claim 9, further comprising initiating the destructive event as part of the test by rebooting the operating system deterministically using the runner agent to make a call to reboot the operating system.

11. The method as in claim 5, further comprising receiving the start event after the destructive event, wherein the destructive event is a network communication interface restart, a data store connection restart, or a container restart.

12. The method as in claim 5, wherein recording the test state further comprises storing the test state in a root volume data store of an operating system.

13. The method as in claim 5, wherein recording the test state further comprises storing the test state in an object store in a service provider environment.

14. The method as in claim 5, further comprising using the test state to select a portion of test code that is to be executed by the runner agent after the destructive event.

15. The method as in claim 5, further comprising obtaining the test state using a call to external software outside the runner agent.

16. The method as in claim 15, further comprising obtaining the test state using the call to external software that is the operating system to determine whether an install has reached a ready state.

17. A non-transitory computer-readable medium containing instructions thereon that, when executed by a system, perform the following:
    executing a runner agent on a computing device;
    executing a test on the computing device using the runner agent;
    recording a test state in a root volume data store of an operating system;
    setting a scheduled task which is scheduled to operate on occurrence of a start event for a portion of the operating system and configured to re-execute the runner agent upon the start event;
    receiving the start event for the portion of the operating system;
    re-executing the runner agent via the scheduled task;
    identifying the test state from the root volume data store when a destructive event occurred; and
    resuming the test from the test state recorded to the root volume data store.

18. The non-transitory computer-readable medium as in claim 17, wherein the scheduled task is an event based task created using a daemon or a task scheduler.

19. The non-transitory computer-readable medium as in claim 17, wherein the instructions, when executed by the system, further perform receiving the start event after the destructive event, wherein the destructive event is an operating system reboot or an operating system sub-system restart.

20. The non-transitory computer-readable medium as in claim 17, wherein the instructions, when executed by the system, further perform initiating the destructive event by using the runner agent to make a call to reboot the operating system.

* * * * *